Aug. 28, 1923.

C. M. McCARTHY

LOCK

Filed Feb. 18, 1922

1,466,537

Inventor
Chas. M. McCarthy

By Mason, Fenwick & Lawrence
Attorneys.

Patented Aug. 28, 1923.

1,466,537

UNITED STATES PATENT OFFICE.

CHARLES M. McCARTHY, OF NORFOLK, VIRGINIA.

LOCK.

Application filed February 18, 1922. Serial No. 537,592.

*To all whom it may concern:*

Be it known that I, CHARLES M. MC-CARTHY, a citizen of the United States, residing at Norfolk, in the county of Norfolk and State of Virginia, have invented certain new and useful Improvements in Locks; and I do hereby declare the following to be a full, clear, and exact description of the invention, such as will enable others skilled in the art to which it appertains to make and use the same.

This invention relates to new and useful improvements in locks and more particularly to an electric lock, the main object of the invention being the provision of an electrically operated lock which can be used in any convenient place where a lock of this type could be used, but it is preferred to adapt the same for use upon motor vehicles for locking the vehicle against appropriation by an unauthorized person.

A further object of the present invention is the provision of an electrically operated lock including a locking bolt, means for reciprocating said bolt within a housing and additional means for locking said bolt in a locked or unlocked position, said means for reciprocating said bolt and for locking the same against movement being electrically controlled.

With the above and other objects in view, the invention consists in the novel features of construction, combination and arrangement of parts hereinafter more fully set forth, pointed out in the claims and shown in the accompanying drawings, in which:

Figure 3:
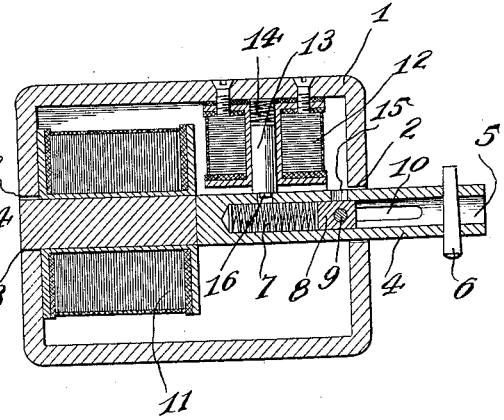
Fig. 3 is a horizontal sectional view.
Figure 4:
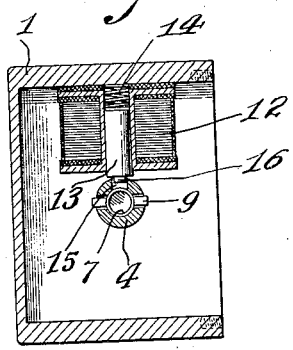
Fig. 4 is a transverse sectional view taken on the line 4—4 of Fig. 2.

My improved lock includes in its construction, a housing or casing 1 having formed in each end thereof the aligned openings 2 and mounted within the casing for sliding movement, with its ends projecting through the openings 2 in each end of the casing is a locking bolt, said locking bolt being formed in two sections, the section 3 constituting the main portion of the locking bolt and is preferably formed of steel or a similar material suitable for the purpose. The other section 4 of the locking bolt is preferably formed of a different material, and preferably provided with a longitudinal bore 5. The sliding movement of the locking bolt through the openings 2 is limited by means of a stop pin 6 which extends transversely through the section 4 of the bolt and is adapted to bear against one end of the frame 1. Arranged within the inner end of the bore 5 is a coil spring 7, said spring being retained within the bore by means of a movable block 8, said block having a transverse pin 9 extending therethrough, the ends of which are arranged within the slots 10 formed within the walls of the section 4 and disposed in diametric opposed relation. Through the movement of the locking bolt to one position, the spring 7 is placed under tension, as shown in Fig. 3, so that when the proper means is actuated to move the bolt to a locked position, the tension of the coil spring 7 will assist in moving the bolt longitudinally. The movement of the pin 9 is limited through engagement with the inner face of one of the end walls of the casing 1 whereby when the locking bolt is moved to an unlocked position, the coil spring 7 will be placed under tension for action upon release of the locking bolt to move the same towards its locking position.

In order to actuate the locking bolt and move the same to its locked position, a solenoid 11 is mounted within the frame 1 and surrounds the section 3 of the locking bolt whereby an electric current supplied to the solenoid 11 will impart movement to the locking bolt whereby to move the same toward its locking position. In order to retain the locking bolt in a locked or unlocked position, a second solenoid 12 is provided and arranged within the casing 1, said solenoid 12 being at right angles to the solenoid 11 and having movable therein, a pin 13 and a coil spring 14 is disposed between the inner end of the pin and the casing 1 whereby tension of the coil spring will tend to move the pin 13 toward and away from the section 4 of the locking bolt.

Figure 2:
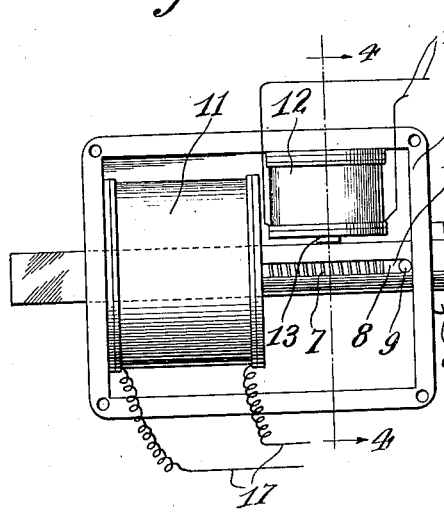
Fig. 2 is a top plan view of the lock.

One side of the section 4 of the locking bolt is provided with spaced openings 15 adapted to receive the inner reduced end 16 of the pin 13 to retain the locking bolt in a locked or unlocked position. In Fig. 3, the locking bolt is illustrated in an unlocked position, the pin 13 having its inner end engaged within one of the openings 15 whereby to retain the locking bolt in an unlocked position. Attention is called to the fact that when the locking bolt is in this position, the spring 7 is placed under tension, but when the locking bolt is released however, the spring 7 will expand and move the locking bolt to a locked position as shown in Fig. 2. After the bolt has been moved to a locked position, the pin 13 is then moved inwardly toward the locking bolt, engaging within the second one of the openings 15 whereby to retain the locking bolt in its locked position, the pin 13 being operated by the solenoid 12 to move the same toward and away from the locking bolt. In order to assure the positive engagement of the pin 13 with the openings 15, the coil spring 14 which is disposed between the pin 13 and side wall of the casing 1, will tend to force the pin 13 outwardly toward the locking bolt.

Figure 1:
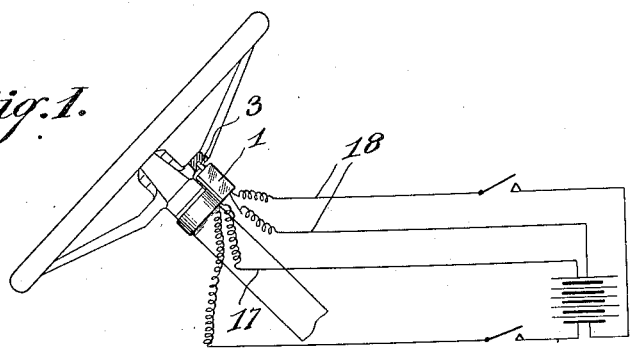
Figure 1 is a side elevation of my improved lock, showing the same as applied to the steering wheel of a motor vehicle.

In Fig. 1, I have shown this device as applied to the steering wheel of a motor vehicle, the section 3 of the locking bolt being illustrated as in a locked position.

In order to release the locking bolt so as to unlock the steering wheel, the pin 13 is actuated by means of the solenoid 12 to disengage the same from the opening 15 in which it is disposed to retain the locking bolt in a locked position, and as soon as the pin 13 is released, the solenoid 11 is actuated to move the bolt longitudinally within the casing 1, disengaging the outer end of the bolt from the steering wheel. The inner movement of the locking bolt compressing the spring 7 while the movement of the pin 13 places the spring 14 under tension so that when the bolt and pin are released from the solenoids, the compression of the springs 11 will move the bolt and pin to a locked position.

The solenoid 11 is connected up by means of the wires 17 to a source of electrical supply, while the solenoid 12 is connected by means of the wires 18 to a source of electrical supply.

As stated heretofore, my improved electrically operated lock may be used in any convenient position where a lock of this character is desired, but I have particularly adapted the device for use upon automobiles, and the construction of the same is so simple that the same can be manufactured and placed upon the market at a comparatively small cost and can also be readily attached to a vehicle for locking the same against appropriation by an unauthorized person.

I claim:

1. In a lock of the class described including a frame having aligned openings formed therein, a locking bolt movable through the frame and mounted in said openings, said bolt having spaced openings formed therein, the combination of springs, means operative to impart movement to said bolt to move the same to a locked position, electrical means to retract the bolt to compress the spring, spring operated means disposed at right angles to the bolt and adapted to engage with said openings to retain the bolt in a locked or unlocked position and electrical means to retract said retaining means.

2. A lock of the class described including a frame, a locking bolt movable longitudinally within said frame, a solenoid surrounding the bolt within the frame and adapted to move the bolt longitudinally to a locked position, means for moving said bolt to an unlocked position when released from the solenoid, said bolt having spaced openings formed therein, a spring actuated pin adapted to project into said openings to retain the bolt in a locked or unlocked position and electrical means for retracting said pin.

3. In a lock of the class described, a frame, a bolt slidable in said frame and comprising two parts, one of magnetic material, the other of non-magnetic material, the latter part provided with a bore extending longitudinally of the bolt and provided further with lateral detents, a solenoid secured in the frame surrounding the magnetic part of the bolt, a compression spring carried in the bore of the non-magnetic part of the bolt, a plunger slidable in the bore and actuated by the said compression spring, said plunger having laterally disposed lugs operative through oppositely disposed slots provided in the bolt to engage the frame, a second solenoid secured within the frame having its axis perpendicular to that of the first solenoid, a compression spring in the bore of said second solenoid between the frame and a magnetic pin provided and slidably disposed in the said bore, the end of said pin adapted to be pressed by said spring against the bolt and to enter said lateral detents therein, respectively, and to be retracted by the energizing of said second solenoid, substantially as specified.

In testimony whereof I affix my signature.

CHARLES M. McCARTHY.